United States Patent
Kwong (10) Patent No.: US 9,207,353 B2
(45) Date of Patent: Dec. 8, 2015

(54) METHOD AND SYSTEM OF RESIN EVALUATION USING PULSED NEUTRON TOOLS

(71) Applicant: HALLIBURTON ENERGY SERVICES, INC., Houston, TX (US)

(72) Inventor: KwokShan Kwong, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/233,189

(22) PCT Filed: May 22, 2013

(86) PCT No.: PCT/US2013/042201
§ 371 (c)(1),
(2) Date: Jan. 16, 2014

(87) PCT Pub. No.: WO2013/184353
PCT Pub. Date: Dec. 12, 2013

(65) Prior Publication Data
US 2014/0330520 A1 Nov. 6, 2014

Related U.S. Application Data

(60) Provisional application No. 61/656,092, filed on Jun. 6, 2012.

(51) Int. Cl.
*G01V 1/40* (2006.01)
*G01V 5/10* (2006.01)
*G01V 5/04* (2006.01)

(52) U.S. Cl.
CPC ............... *G01V 5/102* (2013.01); *G01V 5/045* (2013.01); *G01V 5/101* (2013.01)

(58) Field of Classification Search
CPC ........ G01V 5/102; G01V 5/045; G01V 5/101
USPC ............................................................ 702/8
See application file for complete search history.

(56) References Cited

U.S. PATENT DOCUMENTS

| 4,492,864 | A | | 1/1985 | Smith |
| 4,580,050 | A | | 4/1986 | Paap |
| 4,937,446 | A | * | 6/1990 | McKeon et al. ........... 250/269.7 |
| 5,406,078 | A | * | 4/1995 | Jacobson ...................... 250/261 |
| 2007/0246649 | A1 | * | 10/2007 | Jacobi et al. ............... 250/269.6 |

(Continued)

OTHER PUBLICATIONS

PCT Search Report and Written Opinion, Application No. PCT/US2013/042201, mailed Aug. 23, 2013.

*Primary Examiner* — Janet Suglo
*Assistant Examiner* — Stephanie Bloss
(74) *Attorney, Agent, or Firm* — Chamberlain Hrdlicka (57) ABSTRACT

Resin evaluation using pulsed neutron tool. At least some of the example embodiments are methods including: interrogating an area behind a casing material within a borehole with a plurality of neutrons; obtaining a count rate of inelastic gammas of a first gamma detector for a particular borehole depth, wherein the inelastic gammas comprise gammas emitted in inelastic collisions of the plurality of neutrons with matter behind the casing material; determining an inelastic carbon-oxygen ratio from the inelastic count rate of the first gamma detector; and determining an indication of the composition of the matter behind the casing material from the inelastic carbon-oxygen ratio from the inelastic count rate of the first gamma detector.

17 Claims, 7 Drawing Sheets

(56) References Cited

U.S. PATENT DOCUMENTS

| | | | |
|---|---|---|---|
| 2009/0026359 A1* | 1/2009 | Stephenson et al. | 250/269.7 |
| 2009/0173500 A1* | 7/2009 | Orban et al. | 166/298 |
| 2009/0296084 A1 | 12/2009 | Odom | |
| 2011/0062319 A1* | 3/2011 | Nikitin et al. | 250/254 |
| 2011/0256085 A1* | 10/2011 | Talingting Pabalan et al. | 424/70.13 |

* cited by examiner

FIG.7

METHOD AND SYSTEM OF RESIN EVALUATION USING PULSED NEUTRON TOOLS

CROSS-REFERENCE TO RELATED APPLICATIONS

The present application claims the benefit of U.S. Provisional Patent Application No. 61/656,092 filed Jun. 6, 2012 by Kwokshan Kwong and titled "Method And System of Resin Evaluation Pulsed Neutron Tool," which is incorporated herein by reference as if reproduced in its entirety.

BACKGROUND

Well logging is a technique used to identify characteristics of earth formations surrounding a borehole and/or properties related to the borehole itself. The interrogation to identify one or more characteristics may be by sound, electrical current, electromagnetic waves, or high energy nuclear particles (e.g., gamma particles and neutrons). Receiving the interrogating particle or signal, and determining a property from such particle or signal, is in many cases a complicated endeavor.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, oilfield service companies may refer to a component by different names. This document does not intend to distinguish between components that differ in name but not function.

In the following discussion and in the claims, the terms "including and comprising" are used in an open-ended fashion, and thus should be interpreted to mean "including, but not limited to . . . . " Also, the term "couple" or "couples" is intended to mean either an indirect or direct connection. Thus, if a first device couples to a second device, that connection may be through a direct connection or through an indirect connection via other devices and connections.

"Gamma" or "gammas" shall mean energy created and/or released due to neutron interaction with atoms, and in particular atomic nuclei, and shall include such energy whether such energy is considered a particle (i.e., gamma particle) or a wave (i.e., gamma ray or wave).

"Inelastic count rate" shall mean a gamma count rate during periods of time when gammas created by inelastic collisions are the predominant gammas created and/or counted (e.g., during the neutron burst period). The minority presence of counted capture gammas shall not obviate a count rate's status as an inelastic count rate.

"Capture count rate" shall mean a gamma count rate during periods of time when gammas created by thermal neutron capture are the predominant gammas created and/or counted (e.g., periods of time after the neutron burst period). The minority presence of counted inelastic gammas shall not obviate a count rate's status as capture count rate.

"Resin" shall mean any viscous liquid composition capable of hardening by polymerization or cross-linking into a solid over time, including but not limited to carbon-containing monomers and polymers of thermosetting plastics.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments were developed in the context of wireline logging tools, and thus the description that follows is based on the developmental context; however, the various systems and methods find application not only in wireline logging tools, but also measuring-while-drilling (MWD) and logging-while-drilling tools (LWD). Further still, the various embodiments also find application in "slickline" tools, in which the logging tool is placed downhole (e.g., as part of a drill string, or as a standalone device) and the logging tool gathers data that is stored in a memory within the device (i.e., not telemetered to the surface). Once the tool is brought back to the surface, the data is downloaded, some or all the processing takes place, and the logging data is printed or otherwise displayed. Thus, the developmental context shall not be construed as a limitation as to the applicability of the various embodiments.

The various embodiments are directed to resin evaluation with a pulsed-neutron tool. In particular, in some situations a resin material may be used as the sealing material between a casing and a formation to prevent fluid transfer between zones. For example, a resin material may be used to prevent natural gas migration between gas bearing zones and oil or water bearing zones. Resin may be used instead of cement in the situation of preventing natural gas migration because cement, as a relatively porous material, may not fully impede the flow of natural gas in some situations. One difficulty that arises, however, is evaluating the quality of the resin placement. In the related art, acoustic methods are used to evaluate the quality of the seal between the plug material (e.g., cement, resin) and the casing; however, in the specific case of possible natural gas migration, the acoustic impedance contrast between resin on the one hand, and natural gas on the other hand, is too low for acoustic systems to "see" whether a resin plug has properly sealed. Stated otherwise, acoustic systems may not be able to distinguish a good resin seal from a bad resin seal with migrating gas in the non-seal areas. The issue of evaluation is addressed, at least in part, by way of a pulsed neutron evaluation system. The specification first turns to an illustrative system.

Figures 1, 8:
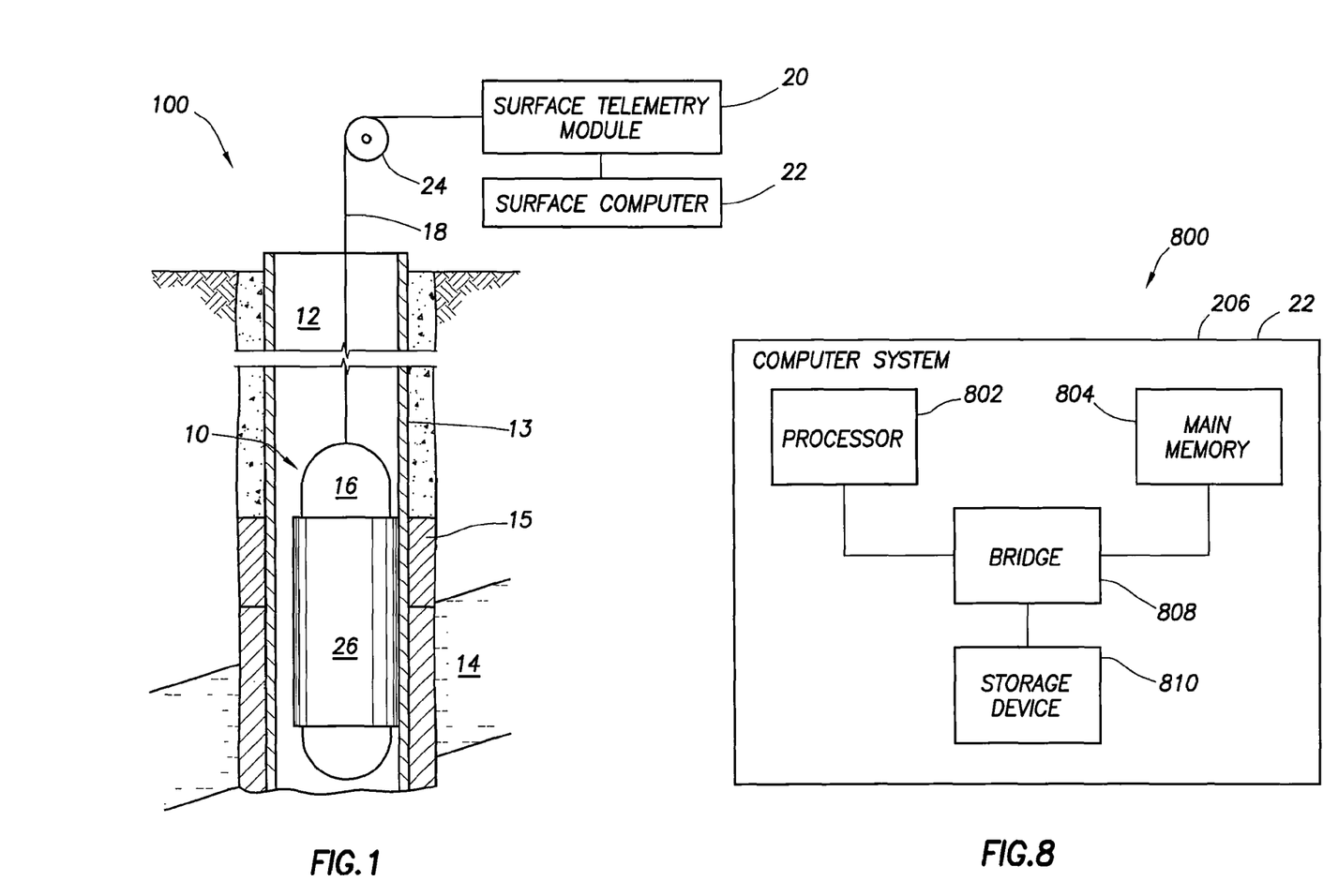
FIG. 1 shows a system in accordance with at least some embodiments.
FIG. 8 shows a computer system in accordance with at least some embodiments.

FIG. 1 illustrates a nuclear logging system 100 constructed in accordance with a least some embodiments. In particular, system 100 comprises a logging tool 10 placed within a borehole 12 proximate to a casing 13, formation 14, and sheave or seal 15 (e.g., resin seal) of interest. The tool 10 comprises a pressure vessel 16 within which various subsystems of the tool 10 reside, and in the illustrative case of FIG. 1 the pressure vessel 16 is suspended within the borehole 12 by a cable 18. Cable 18, in some embodiments a multi-conductor armored cable, not only provides support for the pressure vessel 16, but also in these embodiments communicatively couples the tool 10 to a surface telemetry module 20 and a surface computer 22. The tool 10 may be raised and lowered within the borehole 12 by way of the cable 18, and the depth of the tool 10 within the borehole 12 may be determined by depth measurement system 24 (illustrated as a depth wheel). In some embodiments, the pressure vessel 16 may be covered with a thermal neutron absorptive material 26 (the thickness of which is exaggerated for clarity of the figure); however, in other embodiments the material 26 may be only partially present or omitted altogether.

Figure 2:
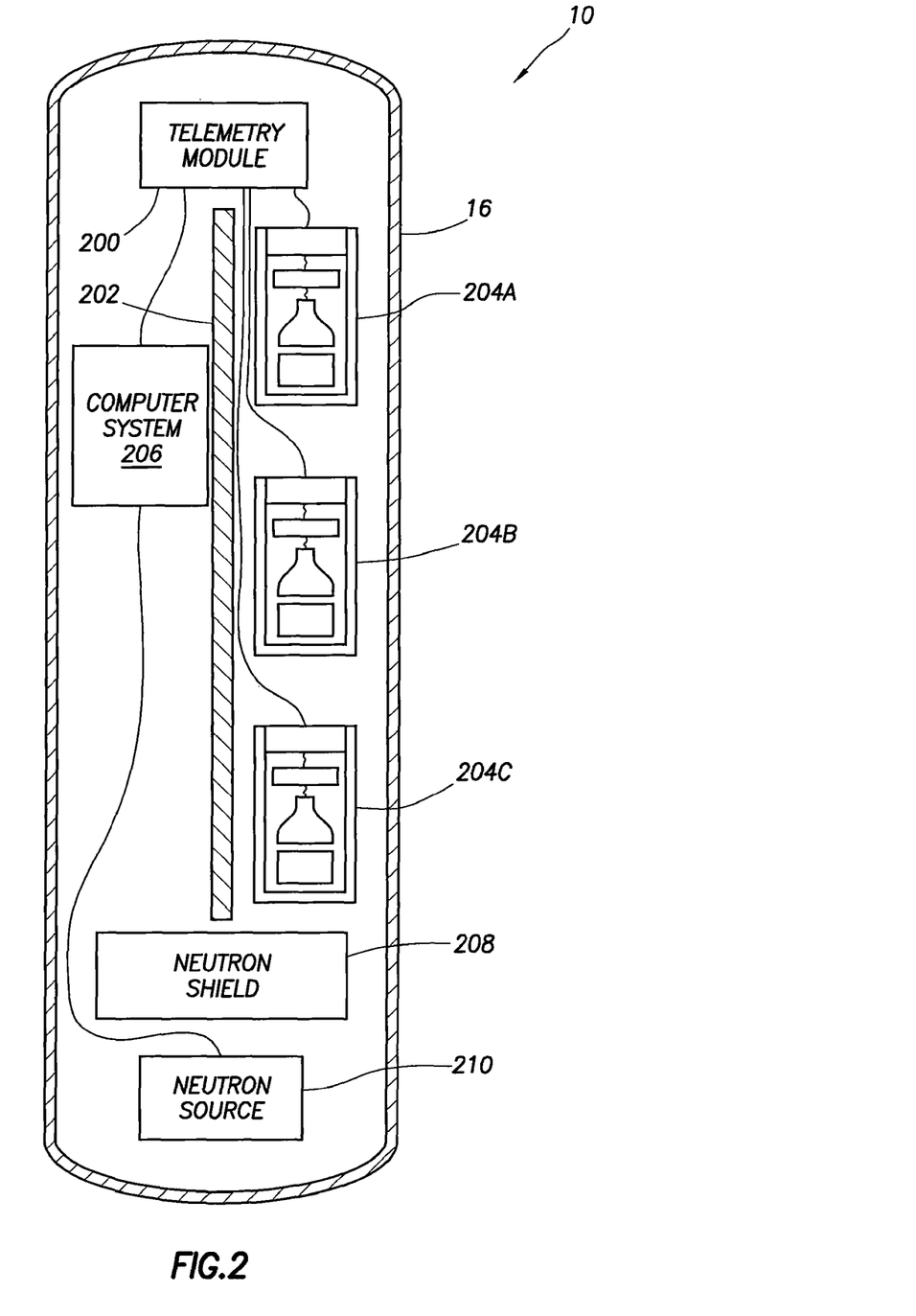
FIG. 2 shows a simplified cross-sectional view of a logging tool in accordance with at least some embodiments.

FIG. 2 shows a simplified cross-sectional view of the logging tool 10 to illustrate the internal components in accordance with at least some embodiments. In particular, FIG. 2 illustrates that the pressure vessel 16 houses various components, such as a telemetry module 200, borehole shield 202, a plurality of gamma detectors 204 (in this illustrative case three gamma detectors labeled 204A, 204B and 204C), computer system 206, a neutron shield 208 and a neutron source 210. While the gamma detectors 204 are shown above the neutron source 210, in other embodiments the gamma detectors may be below the neutron source. Gamma detector 204C may be on the order of 10 inches from the neutron source. The gamma detector 204B may be on the order of 20 inches from the neutron source 210. Gamma detector 204C, being disposed closer to the neutron source, may also be referred to as the near gamma detector or near gamma detector 204C. Conversely, gamma detector 204B, being disposed farther from the neutron source, may be referred to as the far gamma detector or far gamma detector 204B. The gamma detector 204A, if present, may be on the order of 30 inches from the neutron source 210. Other spacing may be equivalently used. Neutron shield 202 may make the gamma detectors 204 receive more favorably formation-sourced gammas (as opposed to borehole-sourced gammas), and the shield may be a high density material (e.g., HEVIMET® available from General Electric Company of Fairfield, Conn.).

In some embodiments the neutron source 210 is a Deuterium/Tritium ("DT") neutron generator, which may produce neutrons having average energy of about 14 MeV. The neutron source 210, activated under command from surface computer 22 and/or computer system 206 within the tool, generates and/or releases energetic neutrons. In order to reduce the incidence of neutrons on the gamma detectors 204 and other devices, neutron shield 208 (e.g., HEVIMET®) separates the neutron source 210 from the gamma detectors 204. Because of the speed of the energetic neutrons (e.g., 30,000 kilometers/second or more), and because of collisions of the neutrons with atomic nuclei that change the direction of movement of the neutrons, a neutron flux is created around the logging tool 10 that extends into the formation 14.

Neutrons generated and/or released by the source 210 interact with atoms of the casing 13, resin 15, and natural gas migrating (if any) past the resin 15 by way of inelastic collisions and/or thermal capture; however, the various embodiments are primarily interested in the inelastic collisions. In the case of inelastic collisions, a neutron inelastically collides with atomic nuclei, a gamma is created (an inelastic gamma), and the energy of the neutron is reduced. When high-energy neutrons scatter with lighter earth elements, such as Hydrogen, the energy loss may be quite large. The neutron may have many inelastic collisions with the atomic nuclei, each time creating an inelastic gamma and losing energy. At least some of the gammas created by the inelastic collisions are incident upon the gamma detectors 204. One or both of the arrival time of a particular gamma and its energy may be used to determine status as an inelastic gamma.

Figure 3:
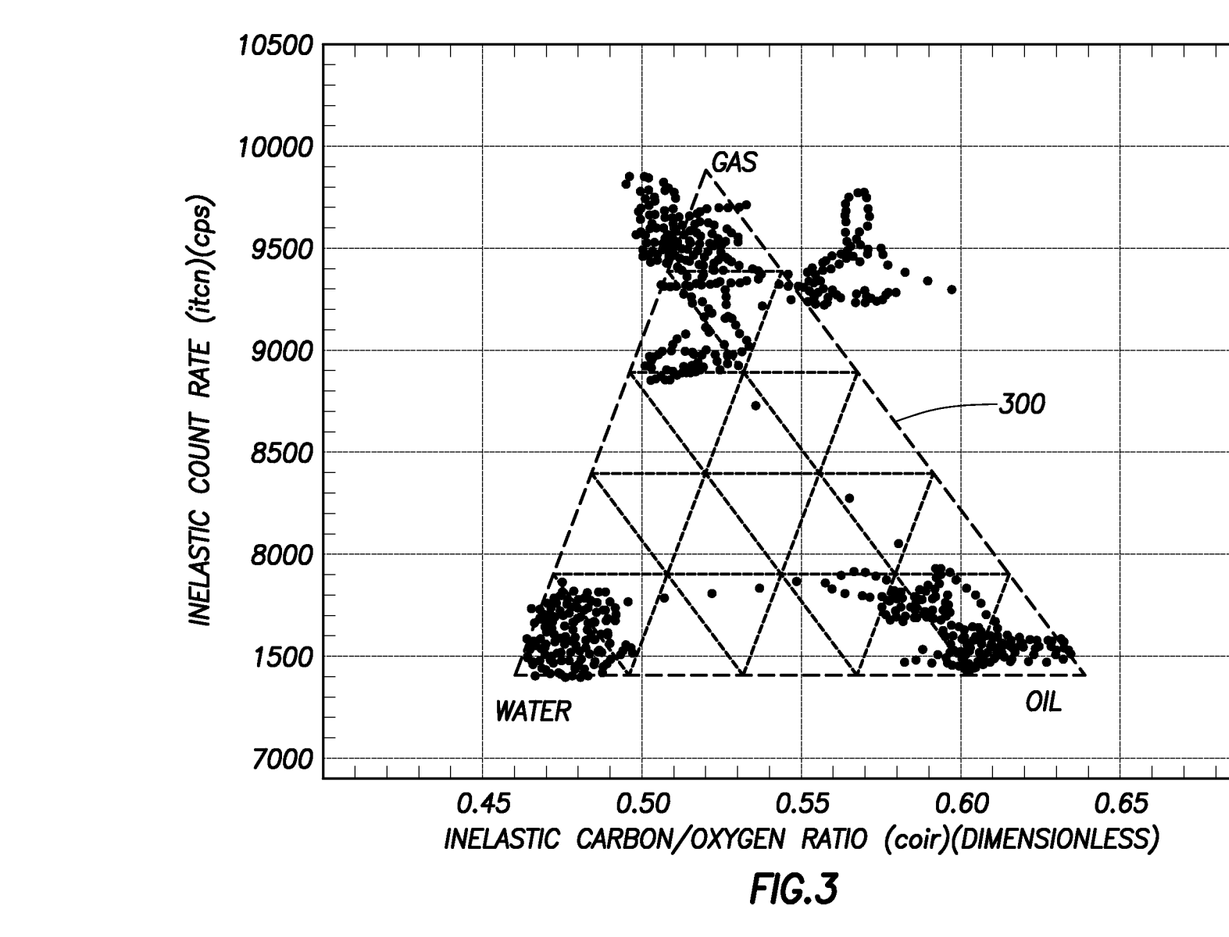
FIG. 3 shows a plot of points in accordance with at least some embodiments.

In some embodiments, the inelastic count rate for the near gamma detector 204C is used to create an indication of how well a resin seal 15 has attached itself to the casing 13 and/or the formation 14. In particular, FIG. 3 shows a plot of near inelastic count rate, i.e. the inelastic count rate from the near gamma detector, on the Y-axis against near inelastic carbon-oxygen ratio on the X-axis. The inelastic count rate on the Y-axis is merely a count rate per unit time, such as counts recorded per second during the burst time of the source 210, and perhaps a short amount of time thereafter in some cases. The near inelastic carbon-oxygen ratio is determined by an analysis of the received gammas at gamma detector 204C. That is, when a neutron interacts with carbon by way of an inelastic collision, the gamma created has a characteristic energy. Likewise, when a neutron interacts with oxygen by way of an inelastic collision, the gamma created has a characteristic energy different from the characteristic energy associated with carbon interactions. An inelastic gamma may lose energy via Compton scattering as it propagates from the point it is emitted to the detector. Thus, in at least some embodiments, an oxygen inelastic gamma count rate and/or a carbon inelastic gamma count rate may be determined by compensating for Compton down-scatter of the energy of the gammas. In accordance with the various embodiments, the count (or count rate) of the gammas associated with carbon interactions, and the count (or count rate) of the gammas associated with the oxygen interactions, are extracted from the received gammas, and a ratio of the carbon count and the oxygen count is created. Thus, the near inelastic carbon-oxygen ratio is determined, and the value is dimensionless in some cases.

Still referring to FIG. 3, within the plot is superimposed a triangle 300. Triangle 300 helps delineate regions within a plot of count rate and inelastic carbon-oxygen ratio within which data points associated with the constituents within the borehole environment might be expected to cluster. For example, the region of the upper vertex, or corner, of triangle 300, where the count rate is relatively higher, may be associated with gas in the borehole environment wherein the lower density of gas relative to liquid constituents would correlate with the relatively higher count rate. Considering the lower vertices, the left vertex with the relatively lower carbon/oxygen ratio would be expected to correspond to carbon poor or oxygen rich liquid constituents and the right vertex to carbon rich or oxygen poor constituents. Thus, in at least some embodiments, the left corner of triangle 300 may be associated with water for example, which contains oxygen and no carbon. Conversely, the right corner may be associated with liquid hydrocarbons such as oil, which are carbon rich and free of oxygen. Further, the values of the carbon/oxygen ratio shown on the horizontal or "X" axis in FIG. 3 are by way of example, these values may vary in other embodiments, and the principles disclosed herein do not depend on the specific values shown. Moreover, in at least some embodiments, the corner of triangle 300 associated with water may have an abscissa value on the "X" axis that is not substantially zero. This may be understood as a contribution from oxygen inelastic gammas that have undergone Compton scattering, as described above, between the point where the gammas were emitted and the detector, thereby shifting their energy downward into the energy range of carbon inelastic gammas. Compton scattering would be recognized by those skilled in the art as a well-known process in the transport of gammas and it would be appreciated that in at least some embodiments in which the Compton scattering of oxygen is small, the abscissa of the "water" vertex of triangle 300 might be substantially near zero. Nevertheless, it is the relative location of clusters of data points that is of interest, as will be further described below.

Thus, for each depth within the borehole 12 for which a pulsed neutron evaluation is performed, a point is placed in the plot and that point is indicative of whether the pulsed-neutron tool "sees" water, natural gas, "oil", or some combination. That is, for pure water behind the casing, the plotted point would reside directly in the water corner, for pure gas behind the casing the plotted point would reside directly in the gas corner, and for pure oil behind the casing, the plotted point would reside directly in the oil corner. However, rarely, if ever, will a single substance reside behind the casing. Moreover, this specification is directed to the situation of possible natural gas migration behind the casing.

The inventor has discovered, however, that a resin seal may manifest itself as points clustering between the region of triangle 300 where data associated with water cluster and the region of triangle 300 where data associated with liquid hydrocarbons, e.g. oil cluster. In some embodiments, the data associated with resin may cluster closer to the "oil" side of the triangle (and again taking into account the assumption that no oil is present). This may be further understood by referring to FIG. 4 depicting a triangular region 400 of a capture count carbon/oxygen space similar to triangle 300 described above.

Thus, a plot similar to FIG. 3 may be evaluated. In general, as described above, data points may be found clustering in regions of triangle 400 in the vicinity of each of the vertices as illustrated by clusterings 402, 404 and 406 in the vicinity of the "Gas", "Water" and "Oil" vertices, respectively. Additionally, if resin is employed as a seal between the casing and formation, a clustering of data points associated with the resin may be observed, depicted as clustering 408 in FIG. 4. It would be appreciated that the depiction of clustering are for the purpose of illustration and do not necessarily represent an envelope of observed data points. Clustering 408 may be expected to reside between the "Water" and "Oil" vertices inasmuch as the composition of resins, which may be used in at least some embodiments, includes both carbon and oxygen and having a carbon content smaller than that of oil. If few points reside proximate the resin area of the plot, and a significant number of points reside in the gas area, it may be deduced that the natural gas is migrating through a channel in the resin at the depths associated with the plot. Likewise, if few points reside proximate the gas area of the plot, and a significant number of points reside in the resin area, it may be deduced that the resin seal and properly adhered to the casing and/or the formation and is preventing natural gas migration between zones.

Figure 4:
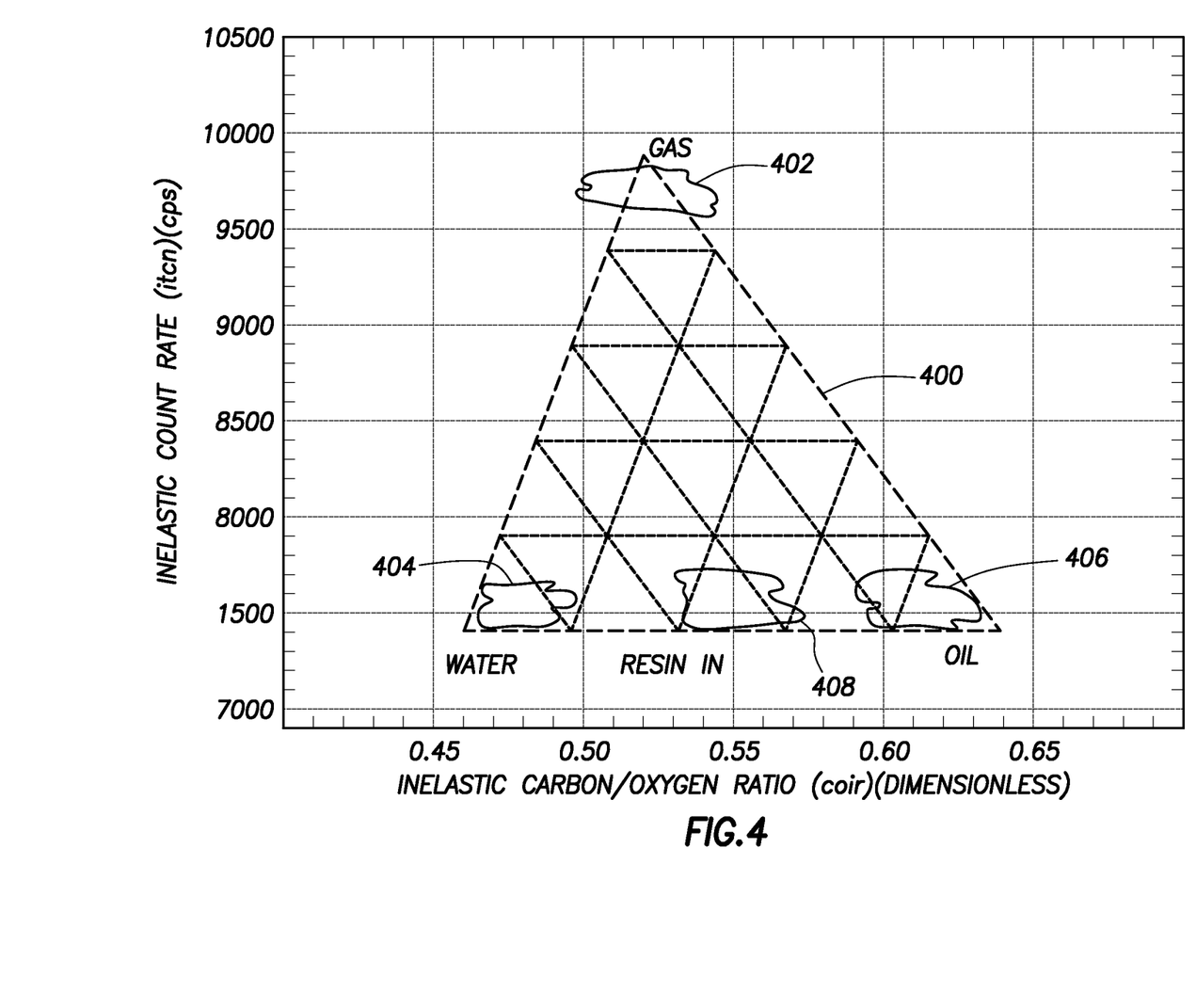
FIG. 4 shows a ternary diagram (no points plotted) in accordance with at least some embodiments.
Figure 5:
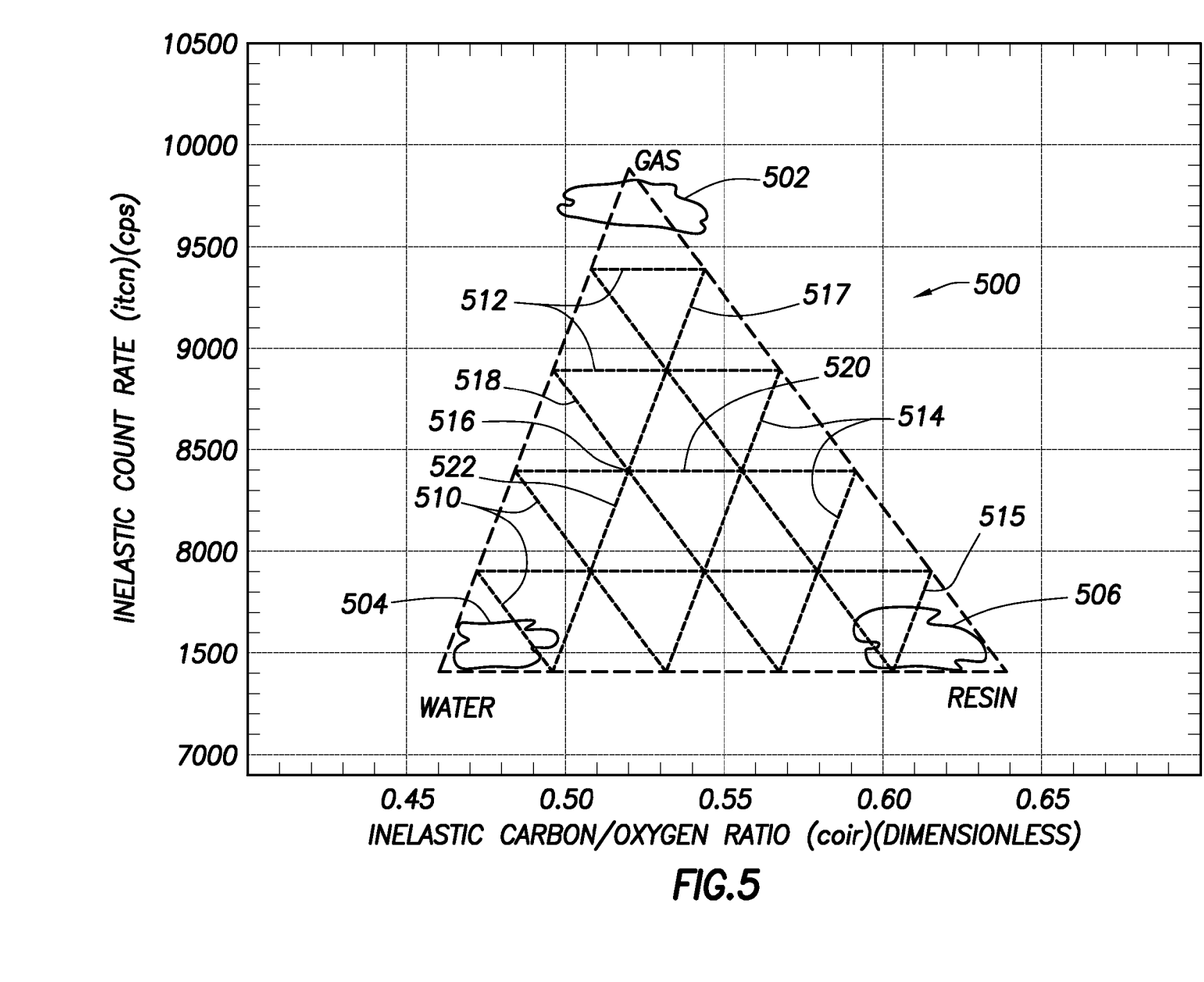
FIG. 5 shows an illustrative ternary diagram in accordance with at least some embodiments.

Further, in at least some embodiments, plots similar to FIG. 4 may be used to estimate the proportion of gas, water, and resin within the wellbore environment. For this purpose, an oil-free zone of the borehole environment is considered. FIG. 5 is an exemplary schematic plot of clusters 502, 504, and 506 representing clusters of data points corresponding to measured count rates versus carbon/oxygen ratio of gas, water and resin, respectively. Clusters 502, 504 and 506 are plotted on a triangle diagram 500 having an upper vertex corresponding to pure (100%) gas, a left vertex corresponding to pure (100%) water and a right vertex corresponding to pure (100%) resin. As would be appreciated by persons skilled in the art, triangle diagram 500 with the vertices corresponding to 100% of the respective constituents comprises a so-called ternary diagram. The triangular tessellation of triangle 500 generated by lines parallel to each of the sides of triangle 500 may be used to estimate the relative proportions of each of gas, water and resin in the borehole environment. Lines 510 parallel to the right side of triangle 500 represent percentages of water, lines 512 parallel to the base of triangle 500 represent percentages of gas, and lines 514 parallel to the left side of triangle 500 represent percentages of resin. The percentages represented by the respective sets of lines decrease in the direction away from the corner of the triangle corresponding to the associated constituent. In the exemplary embodiment of triangle 500, four lines of each type are shown, and thus correspond to intervals of 20% in the percentages of the respective constituents with, for example, line 515 comprising an 80% resin line and line 517 comprising a 20% resin line. It would be readily appreciated that in other embodiments of a ternary triangle, or diagram analogous to triangle 500, other numbers of such lines may be used corresponding to different percentage intervals. To appreciate how the proportions of the constituents of a wellbore environment may be estimated, consider a point 516, which, for ease of illustration has been taken at the intersection of one of lines 510, 512 and 514. Point 516 corresponds to the intersection of the 40% water line 518, the 40% gas line 520, and the 20% resin line 522. Thus, a data point falling close to point 516 would correspond to a mixture of gas, water and resin in the borehole environment in the proportions of about 40% gas, 40% water and 20% resin. Alternatively, the proportions may be determined by solving a system of three linear equations. If the fractions of water, gas and resin are denoted $f_w$, $f_g$, and $f_r$ respectively, then for a data point, P, having coordinates (abscissa, ordinate) of ($coir_p$, $itcn_p$), values of $f_{wp}$, $f_{gp}$, and $f_{rp}$ for data point P may be determined by simultaneously solving the three equations:

$$f_{wp}*itcn_w + f_{gp}*itcn_g + f_{rp}*itcn_r = itcn_p \quad (1)$$

$$f_{wp}*coir_w + f_{gp}*coir_g + f_{rp}*coir_r = coir_p \quad (2)$$

$$f_{wp} + f_{gp} + f_{rp} = 1 \quad (3)$$

In Equations 1 and 2, ($coir_w$, $itcn_w$), ($coir_g$, $itcn_g$), and ($coir_r$, $itcn_r$), are the coordinates of the water, gas and resin apices of triangle 500, respectively. Additionally, in at least some embodiments, if an independent measurement of the fractions of the fluid constituents (which may be referred to as the "holdup" and a tool for making such measurements may be referred to as a holdup device) in the borehole is available, the remaining constituents may then be attributed to a portion of the borehole environment between the casing 13 and the formation 14, referred to in FIG. 6 described below, as annulus 17. For example, if a holdup device determines the borehole contains water, then the annulus may be comprised of gas and resin.

Figure 6:
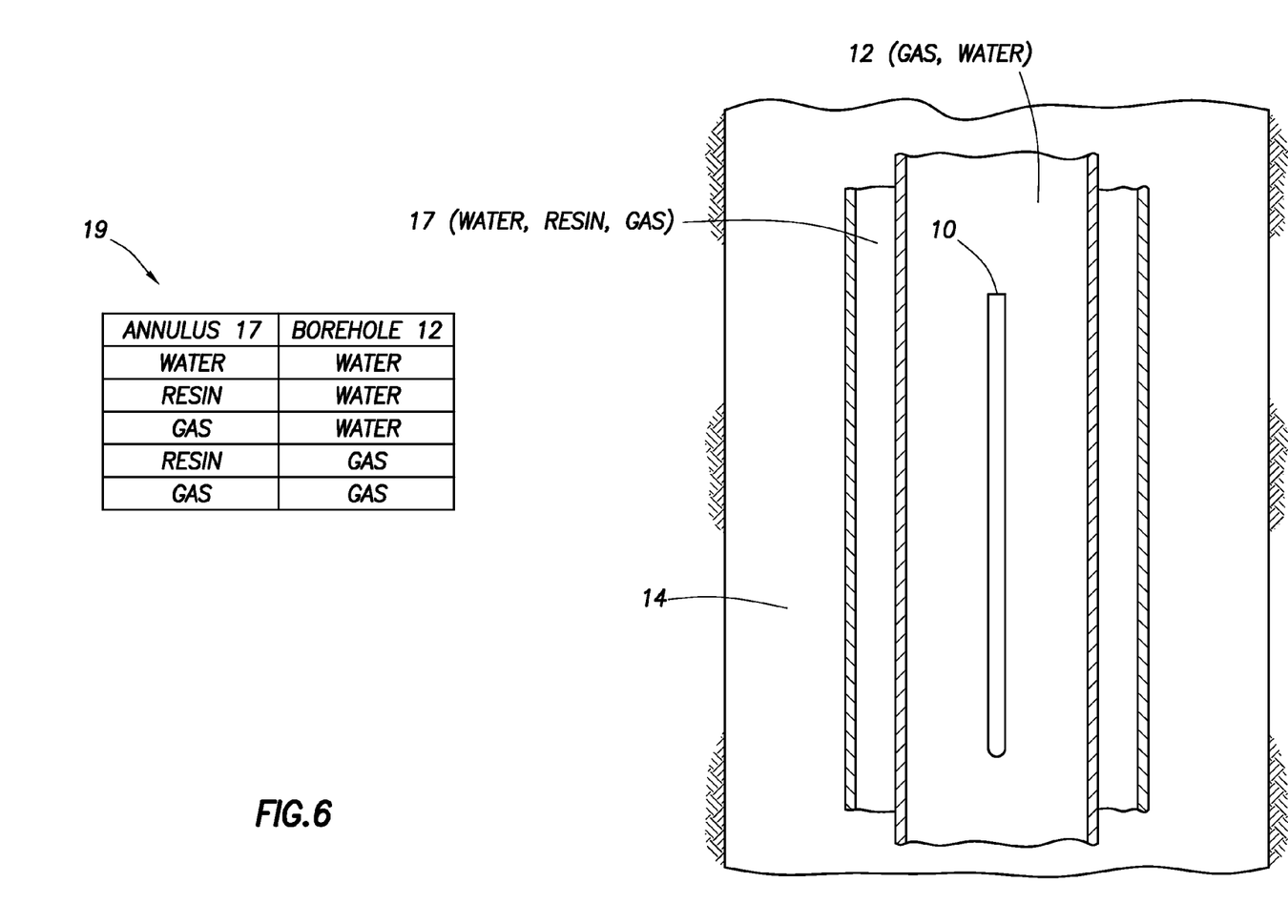
FIG. 6 shows a simplified cross-sectional view of a wellbore environment and various possible conformance scenarios in accordance with at least some embodiments.

The various embodiments discussed to this point have used the gamma readings from a single, closely spaced, gamma detector. However, in other embodiments multiple gamma detectors may be used. In most cases, greater distance between the gamma source 210 and a gamma detector 204 results in greater depth of investigation (i.e., the interrogating extends further radially outward from the logging tool 10). Thus, by evaluating multiple plots created as discussed above, one may not only derive how well the resin seal has adhered to the casing and/or formation, but also the thickness of the resin (measured radially outward) at each location, and the disposition of constituents moving outward radially, thereby providing for evaluating various conformance scenarios within the wellbore environment. As would be appreciated by those skilled in the art, conformance scenarios relate to the control of unwanted gas and water in an oil well, as shown in FIG. 6 illustrating a simplified cross-section of a wellbore environment and example conformance scenarios. Constituents within annulus 17 may include water, resin or gas, or a mixture thereof; the resin being employed, in at least some embodiments, to control the flow of gas and water into the borehole. Table 19 summarizes the various conformance scenarios based on the combinations of some of the possible constituents in borehole 12 and annulus 17. It would be appreciated by those skilled in the art that not all combinations are necessarily present in any particular embodiment of a borehole environment. It would also be appreciated that, as discussed above, combinations of such constituents may also occur.

With the above as background, consider, for example, constituent proportions as determined from inelastic carbon-oxygen ratios as described above for a far-spaced gamma detector, e.g. gamma detector 204B or 204A, and a near-spaced detector, e.g. gamma detector 204C. For illustrative purposes, suppose the plot for the far-spaced detector indicates a greater proportion of water relative to resin than the plot for a near-spaced detector. That is the plot for the near-spaced detector reveals constituents comprising substantially all resin, or a mixture of resin and gas with substantially no water, while the plot from the far-spaced detector reveals a mixture of water and resin. Then it may be inferred that this illustrative embodiment comprises a wellbore in a water-wet formation, and further that the resin has run up to the formation. That is, at the position of the tool, e.g. logging tool 10, in the wellbore there are no apparent voids in the resin.

Figure 7:
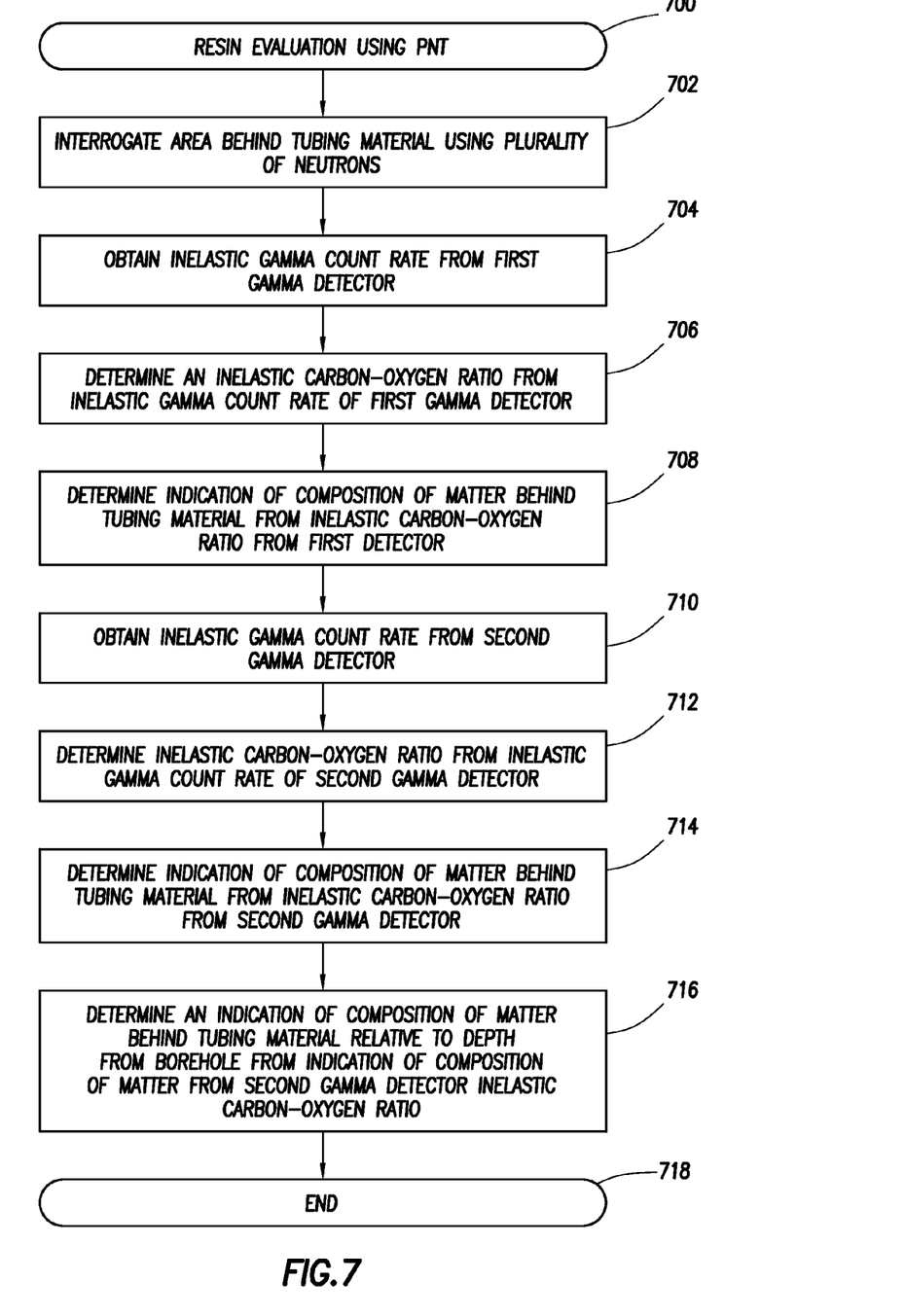
FIG. 7 shows a flowchart of a process in accordance with at least some embodiments.

Referring now to FIG. 7, there is shown a flowchart of process 700 for resin evaluation using a pulsed neutron tool ("PNT"). In block 702, an area behind casing material, such as material forming casing 13 is interrogated using a plurality of neutrons as may be generated using a neutron source 210. As previously described, in at least some embodiments neutron source 210 may be a pulsed DT neutron source. An inelastic gamma count is obtained from a first gamma counter, block 704; the inelastic gammas being emitted in inelastic scattering of the interrogating neutrons off of the nuclei of the constituent matter of the borehole environment behind the casing material, including annulus 17 and formation 14. From the inelastic gamma count rate, an inelastic carbon-oxygen ratio is determined, block 706. From the inelastic carbon-oxygen ratio from the first detector determined in block 706, an indication of the relative proportions of the constituents in the borehole environment are determined, block 708.

In an embodiment employing count data from a single detector, the indication of the relative proportions determined in block 708 may represent an average over a radial cross section of the borehole environment interrogated by the neutrons. In an alternative embodiment employing inelastic counts from multiple detectors, information on the constituent composition relative to depth from the borehole may be obtained, as described above.

Thus, in block 710, inelastic gamma counts from a second gamma detector are obtained. The second gamma detector may be a far-spaced detector such as gamma detector 204A or 204B. An inelastic carbon-oxygen ratio is determined from the second detector inelastic gamma count, block 712, and in block 714, an indication of the composition of the constituents of the matter behind the casing material is determined. From the indication of the composition determined in block 714, the composition relative to the depth from the borehole is determined, block 716. Process 700 ends at block 718.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable media (i.e., not a carrier wave) that stores a software program to implement the method aspects of the various embodiments.

FIG. 8 illustrates in greater detail a computer system 800, which is illustrative of both the surface computer system 22 and the computer system 206 within the logging tool 10. Thus, the computer system 800 described with respect to FIG. 8 could be proximate to the borehole during the time period within the tool 10 is within the borehole, the computer system 800 could be located at the central office of the oilfield services company, or the computer system 800 could be within the logging tool 10 (such as for LWD or MWD tools). The computer system 800 comprises a processor 802, and the processor couples to a main memory 804 by way of a bridge device 808. Moreover, the processor 802 may couple to a long term storage device 810 (e.g., a hard drive) by way of the bridge device 808. Programs executable by the processor 802 may be stored on the storage device 810, and accessed when needed by the processor 802. The program stored on the storage device 810 may comprise programs to implement the various embodiments of the present specification, including programs to implement selecting a gamma detector to use in the hydrogen index (equivalently, porosity) determination, calculating the ratio of the inelastic gamma count rate to capture gamma count rate for each of the detectors, calculating the value of indicative of hydrogen index or porosity, and producing a plot of the value indicative of hydrogen index. In some cases, the programs are copied from the storage device 810 to the main memory 804, and the programs are executed from the main memory 804. Thus, both the main memory 804 and storage device 810 are considered computer-readable storage mediums. The ratios and values indicative of hydrogen index generated by the computer system 810 may be sent to a plotter that creates a paper-log, or the values may be sent to a display device, which may make a representation of the log for viewing by a geologist or other person skilled in the art of interpreting such logs.

The above discussion is meant to be illustrative of the principles and various embodiments of the present invention. Numerous variations and modifications will become apparent to those skilled in the art once the above disclosure is fully appreciated. For example, while the various embodiments are discussed in the context of casing and materials behind a casing, the various embodiments may find application in evaluation behind any casing material (e.g., casing, producing tubing). It is intended that the following claims be interpreted to embrace all such variations and modifications.

I claim:

1. A method comprising:
   interrogating an area behind a casing material within a borehole with a plurality of neutrons;

obtaining a count rate of inelastic gammas of a first gamma detector for a particular borehole depth, wherein the inelastic gammas comprise gammas emitted in inelastic collisions of the plurality of neutrons with matter behind the casing material, the matter comprising water, oil, and resin;

determining an inelastic carbon-oxygen ratio from the inelastic count rate of the first gamma detector; and determining an indication of the composition of the matter behind the casing material from the inelastic carbon-oxygen ratio from the inelastic count rate of the first gamma detector, wherein the determining an indication of the composition of matter comprises:

plotting the inelastic count rate and the inelastic carbon-oxygen ratio determined from the inelastic count rate of the first detector on a ternary diagram for water, oil, and resin, and determining an indication of resin based on a clustering between oil and water on the ternary diagram.

2. The method of claim 1 wherein the determining an inelastic carbon-oxygen ratio from the inelastic count rate of the first gamma detector comprises:

determining an oxygen inelastic gamma count rate from the count rate of inelastic gammas of the first gamma detector;

determining a carbon inelastic gamma count rate from the count rate of inelastic gammas of the first gamma detector; and calculating a ratio of the carbon inelastic gamma count rate of the first gamma detector and the oxygen inelastic gamma count rate of the first gamma detector.

3. The method of claim 1 further comprising:

obtaining a count rate of inelastic gammas of a second gamma detector for a particular borehole depth, wherein the inelastic gammas comprise gammas emitted in inelastic collisions of the plurality of neutrons with matter behind the casing material;

determining an inelastic carbon-oxygen ratio from the inelastic count rate of the second gamma detector; and determining an indication of the composition of the matter behind the casing material from the inelastic carbon-oxygen ratio from the inelastic count rate of the second detector.

4. The method of claim 3 further comprising determining an indication of the composition of the matter behind the casing material relative to depth of the matter from the borehole using the indication of the composition of the matter behind the casing material from the inelastic carbon-oxygen ratio from the inelastic count rate of the second detector.

5. The method of claim 4 wherein the second gamma detector is disposed a distance from a source of the neutrons greater than a distance of the first gamma detector from the source of neutrons, and wherein determining an indication of the composition of matter relative to depth of the matter from the borehole comprises determining the indication of the composition of matter from the inelastic carbon-oxygen ratio from the inelastic count rate of the second detector and the indication of the composition of matter from the inelastic carbon-oxygen ratio from the inelastic count rate of the first detector.

6. The method of claim 4 wherein the matter behind the casing material comprises water, gas, and resin, and wherein the determining an indication of the composition of matter from the inelastic carbon-oxygen ratio from the inelastic count rate of the second detector comprises:

plotting the inelastic count rate and the inelastic carbon-oxygen ratio determined from the inelastic count rate of the second detector on a ternary diagram for water, gas, and resin.

7. A system comprising:

a downhole tool comprising a source of neutrons and a first gamma detector configured to count gamma arrivals;

a processor coupled to a memory, to the source of neutrons, and to the first gamma detector;

wherein the memory stores a program that, when executed by the processor, causes the processor to:

activate the source of neutrons to interrogate an area behind a casing material within a borehole;

obtain a count rate of inelastic gammas from a first gamma detector for a particular borehole depth, wherein the inelastic gammas comprise gammas emitted in inelastic collisions of the plurality of neutrons with matter behind the casing material;

generate an inelastic carbon-oxygen ratio from the inelastic count rate of the first gamma detector; and determine relative proportions of gas, water, and resin behind the casing material from the inelastic carbon-oxygen ratio from the inelastic count rate of the first gamma detector, wherein when the processor generates the inelastic carbon-oxygen ratio, the program further causes the processor to:

determine an oxygen inelastic gamma count rate from the count rate of inelastic gammas of the first gamma detector;

determine a carbon inelastic gamma count rate from the count rate of inelastic gammas of the first gamma detector; and calculate a ratio of the carbon inelastic gamma count rate of the first gamma detector and the oxygen inelastic gamma count rate of the first gamma detector.

8. The system of claim 7 further comprising a second gamma detector coupled to the processor and wherein the program, when executed by the processor, further causes the processor to obtain a count rate of inelastic gammas of the second gamma detector for a particular borehole depth, wherein the inelastic gammas comprise gammas emitted in inelastic collisions of the plurality of neutrons with matter behind the casing material;

determine an inelastic carbon-oxygen ratio from the inelastic count rate of the second gamma detector; and determine a value indicative of the composition of the matter behind the casing material from the inelastic carbon-oxygen ratio from the inelastic count rate of the second detector.

9. The system of claim 8 wherein when the program determines the value indicative of the composition of the matter behind the casing material, the program further causes the processor to determine a value indicative of the composition of the matter behind the casing material relative to depth of the matter from the borehole using the value indicative of the composition of the matter behind the casing material from the inelastic carbon-oxygen ratio from the inelastic count rate of the second detector.

10. The system of claim 8 wherein the second gamma detector is disposed a distance from a source of the neutrons greater than a distance of the first gamma detector from the source of the neutrons.

11. The system of claim 10 wherein when the processor determines a value indicative of the composition of matter, the program further causes the processor to: determine the value indicative of the composition of matter from the inelastic carbon-oxygen ratio from the inelastic count rate of the second detector and the value indicative of the composition of matter from the inelastic carbon-oxygen ratio from the inelastic count rate of the first detector.

12. The system of claim 7 wherein when the processor determines an oxygen inelastic gamma count rate from the count rate of inelastic gammas of the first gamma detector, the program causes the processor to compensate the count rate of inelastic gammas for Compton down-scattering of energy of the gammas.

13. A non-transitory computer readable storage medium storing a program that, when executed by a processor, causes the processor to:
  obtain a count rate of inelastic gammas from a first gamma detector for a particular borehole depth, wherein the inelastic gammas comprise gammas emitted in inelastic collisions of a plurality of neutrons with matter behind casing material in a borehole, the matter comprising water, oil, and resin;
  generate an inelastic carbon-oxygen ratio from the inelastic count rate of the first gamma detector; and
  determine relative proportions of water, oil, and resin behind the casing material from the inelastic carbon-oxygen ratio from the inelastic count rate of the first gamma detector,
  wherein when the processor determines the relative proportions, the program causes the processor to determine by plotting the inelastic count rate and the inelastic carbon-oxygen ratio determined from the inelastic count rate of the first detector on a ternary diagram for water, oil, and resin, and
  wherein an indication of resin is determined based upon a clustering between oil and water on the ternary diagram.

14. The non-transitory storage medium of claim 13 wherein when the program determines an inelastic carbon-oxygen ratio from the inelastic count rate of the first gamma detector, the program causes the processor to:
  determine an oxygen inelastic gamma count rate from the count rate of inelastic gammas of the first gamma detector;
  determine a carbon inelastic gamma count rate from the count rate of inelastic gammas of the first gamma detector; and
  calculate a ratio of the carbon inelastic gamma count rate of the first gamma detector and the oxygen inelastic gamma count rate of the first gamma detector.

15. The non-transitory storage medium of claim 13 wherein the program when executed by the processor further causes the processor to:
  obtain a count rate of inelastic gammas of a second gamma detector for a particular borehole depth, wherein the inelastic gammas comprise gammas emitted in inelastic collisions of the plurality of neutrons with matter behind the casing material;
  determine an inelastic carbon-oxygen ratio from the inelastic count rate of the second gamma detector; and
  determine a value indicative of the composition of the matter behind the casing material from the inelastic carbon-oxygen ratio from the inelastic count rate of the second detector.

16. The non-transitory storage medium of claim 15 wherein when the processor determines a value indicative of the composition of matter relative to depth, the program causes the processor to determine the value indicative of the composition of matter from the inelastic carbon-oxygen ratio from the inelastic count rate of the second detector and the value indicative of the composition of matter from the inelastic carbon-oxygen ratio from the inelastic count rate of the first detector.

17. The non-transitory storage medium of claim 15 wherein when the processor obtains a count rate of inelastic gammas of the second gamma detector, the program causes the processor to obtain the gamma count rate of inelastic gammas from a second detector disposed a distance from a source of the plurality of neutrons than a distance of the first gamma detector from the source of the plurality of neutrons.

* * * * *